(12) United States Patent
You et al.

(10) Patent No.: US 11,933,916 B2
(45) Date of Patent: *Mar. 19, 2024

(54) ILLUMINATION DEVICE INCLUDING A META-SURFACE, ELECTRONIC APPARATUS INCLUDING THE SAME, AND ILLUMINATION METHOD

(71) Applicant: SAMSUNG ELECTRONICS CO., LTD., Suwon-si (KR)

(72) Inventors: Jangwoo You, Seoul (KR); Namseop Kwon, Suwon-si (KR); Byunghoon Na, Suwon-si (KR); Minkyung Lee, Suwon-si (KR); Suyeon Lee, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,441

(22) Filed: Sep. 16, 2022

(65) Prior Publication Data
US 2023/0018444 A1 Jan. 19, 2023

Related U.S. Application Data

(63) Continuation of application No. 16/557,393, filed on Aug. 30, 2019, now Pat. No. 11,474,208.
(Continued)

(30) Foreign Application Priority Data

Mar. 18, 2019 (KR) .................. 10-2019-0030559

(51) Int. Cl.
*G01S 7/481* (2006.01)
*G01S 17/08* (2006.01)
(Continued)

(52) U.S. Cl.
CPC ............ *G01S 7/4815* (2013.01); *G01S 17/08* (2013.01); *G02B 1/00* (2013.01); *G02B 5/1809* (2013.01);
(Continued)

(58) Field of Classification Search
CPC ................ G01S 7/4815; G02B 5/1809; G02B 2207/101; G02F 1/13
See application file for complete search history.

(56) References Cited

U.S. PATENT DOCUMENTS 9,748,644 B2 8/2017 Driscoll et al.
11,181,775 B2 11/2021 You
(Continued)

FOREIGN PATENT DOCUMENTS

KR 20170015109 A * 2/2017

*Primary Examiner* — Tracie Y Green
(74) *Attorney, Agent, or Firm* — Sughrue Mion, PLLC

(57) ABSTRACT

Provided is an illumination device including a display panel including a first surface and a second surface that is opposite to the first surface, the display panel being configured to output light including image information through the first surface, a light source configured to emit light, the light source being spaced apart from the display panel in a direction away from and normal to the second surface of the display panel, a window panel including a first area configured to transmit the light output from the display panel and a second area configured to transmit the light emitted from the light source, and a light transmitting unit provided between the window panel and the light source, the light transmitting unit configured to transmit the light emitted from the light source to an object through the second area, the light transmitting unit including at least one meta-surface.

20 Claims, 9 Drawing Sheets

Related U.S. Application Data

(60) Provisional application No. 62/730,281, filed on Sep. 12, 2018, provisional application No. 62/728,252, filed on Sep. 7, 2018.

(51) Int. Cl.
  *G02B 1/00* (2006.01)
  *G02B 5/18* (2006.01)
  *G02F 1/13* (2006.01)

(52) U.S. Cl.
  CPC .............. *G02F 1/13* (2013.01); *G02F 1/1313* (2013.01); *G02B 2207/101* (2013.01)

(56) References Cited

U.S. PATENT DOCUMENTS

| | | |
|---|---|---|
| 2007/0263388 A1 | 11/2007 | Lai et al. |
| 2017/0116462 A1 | 4/2017 | Ogasawara |
| 2017/0126944 A1 | 5/2017 | Jagt et al. |
| 2017/0287151 A1 | 10/2017 | Han |
| 2017/0353004 A1 | 12/2017 | Chen et al. |
| 2018/0005006 A1 | 1/2018 | Chai |
| 2018/0074226 A1 | 3/2018 | Nomoto |
| 2018/0246262 A1 | 8/2018 | Zhan |
| 2019/0377067 A1 | 12/2019 | Han |

\* cited by examiner

ILLUMINATION DEVICE INCLUDING A META-SURFACE, ELECTRONIC APPARATUS INCLUDING THE SAME, AND ILLUMINATION METHOD

CROSS-REFERENCE TO RELATED APPLICATIONS

This application is a continuation of U.S. application Ser. No. 16/557,393, filed Aug. 30, 2019, which claims the benefit of U.S. Provisional Application No. 62/728,252, filed on Sep. 7, 2018 in the U.S. Patent and Trademark Office, and U.S. Provisional Application No. 62/730,281, filed on Sep. 12, 2018 in the U.S. Patent and Trademark Office, and priority to Korean Patent Application No. 10-2019-0030559, filed on Mar. 18, 2019 in the Korean Intellectual Property Office, the disclosures of which are incorporated herein in their entireties by reference.

BACKGROUND

1. Field

Example embodiments of the present disclosure relate to an illumination device, an electronic apparatus including the illumination device, and an illumination method.

2. Description of the Related Art

Technologies for mobile devices such as smartphones equipped with sensors such as proximity sensors, three dimensional (3D) depth sensors, or the like have been developed. To apply such sensors to smartphones, light-emitting devices capable of generating light necessary for sensing are required. In this case, it may be difficult to provide a region in which a light-emitting device is provided in a smartphone.

In general, a smartphone includes a display panel to display images. Such a display panel is divided into a plurality of regions on which on-off control is performed to display images, and such regions are referred to as display pixels. Display pixels include display elements such as light-emitting diodes (LEDs) configured to display images, and circuit elements configured to control the display elements. Since a metallic material that does not transmit light is included in the circuit elements, light necessary for sensing operations of sensors may not pass through the display pixels.

Therefore, a light-emitting device configured to generate light necessary for sensing may have to be provided in a region separate from the display panel. In this case, however, the size of a smartphone may increase because an area other than the display panel is required. Alternatively, a notch may be formed in a region of a display panel to place a light-emitting device in the notch. However, this may complicate the design of a display surface of the display panel.

SUMMARY

One or more example embodiments provide an illumination device configured to output light through an edge portion of a display surface of an electronic apparatus, and an electronic apparatus including the illumination device.

One or more example embodiments provide an illumination method of outputting light through an edge portion of a display surface of an electronic apparatus.

Additional aspects will be set forth in part in the description which follows and, in part, will be apparent from the description, or may be learned by practice of the example embodiments.

According to an aspect of an example embodiment, there is provided an illumination device including a display panel including a first surface and a second surface that is opposite to the first surface, the display panel being configured to output light including image information through the first surface, a light source configured to emit light, the light source being spaced apart from the display panel in a direction away from and normal to the second surface of the display panel, a window panel including a first area configured to transmit the light output from the display panel and a second area configured to transmit the light emitted from the light source, and a light transmitting unit provided between the window panel and the light source, the light transmitting unit configured to transmit the light emitted from the light source to an object through the second area, the light transmitting unit comprising at least one meta-surface.

The at least one meta-surface of the light transmitting unit may include a first meta-surface configured to deflect the light emitted from the light source such that the light deflected by the first meta-surface has a first directivity, a second meta-surface configured to deflect the light deflected by the first meta-surface and having the first directivity such that the light deflected by the second meta-surface has a second directivity that is different from the first directivity, and a third meta-surface configured to diffuse the light deflected by the second meta-surface.

A center portion of the second meta-surface and a center portion of the third meta-surface may face the second area in a direction normal to the second area.

A center portion of the first meta-surface may be closer to the display panel than the center portion of the second meta-surface is to the display panel.

The first directivity may correspond to a direction from the center portion of the first meta-surface toward the center portion of the second meta-surface.

The second directivity may correspond to a direction from the center portion of the second meta-surface toward the center portion of the third meta-surface.

The second directivity may be equal to a direction in which the light emitted from the light source propagates toward the first meta-surface.

The light transmitting unit may further include a first substrate provided between the first meta-surface and the second meta-surface, and a second substrate provided between the second meta-surface and the third meta-surface.

The first meta-surface may include a plurality of first nanostructures having a shape dimension which is less than a wavelength of the light emitted from the light source.

The first meta-surface may be configured to collimate the light emitted from the light source based on a shape and a distribution of each of the plurality of first nanostructures.

The second meta-surface may include a plurality of second nanostructures having a shape dimension which is less than a wavelength of the light from the light source.

The second meta-surface may be configured to collimate the light output from the first meta-surface based on a shape and a distribution of each of the plurality of second nanostructures.

The third meta-surface may include a plurality of third nanostructures having a shape dimension which is less than a wavelength of the light from the light source.

The third meta-surface may be configured to diffuse and transmit the light output from the second meta-surface to radiate the object with flood illumination based on a shape and a distribution of each of the plurality of third nanostructures.

The flood illumination may have a field of view of 80 degrees.

The light source may include a plurality of light-emitting elements.

Each of the plurality of light-emitting elements may include a vertical cavity surface emitting laser (VCSEL).

The illumination device may further include a support substrate provided on a lower side of the light source opposite to the light transmitting unit, a plurality of support portions provided between the support substrate and the light transmitting unit and configured to provide a space in which the light source is provided, and a housing surrounding the window panel, the light transmitting unit, the support substrate, and the plurality of support portions.

According to another aspect of an example embodiment, there is provided an electronic apparatus including an illumination device including a display panel including a first surface and a second surface that is opposite to the first surface, the display panel being configured to output light including image information through the first surface, a light source configured to emit light, the light source being spaced apart from the display panel in a direction away from and normal to the second surface of the display panel, a window panel including a first area configured to transmit the light output from the display panel and a second area configured to transmit the light emitted from the light source, and a light transmitting unit provided between the window panel and the light source, the light transmitting unit configured to transmit the light emitted from the light source to an object through the second area, the light transmitting unit comprising at least one meta-surface, a sensor configured to receive light reflected from the object, and a processor configured to acquire information about the object based on the light received by the sensor.

According to yet another aspect of an example embodiment, there is provided an illumination method using an illumination device, the illumination device including a window panel having a first area and a second area, and a light source provided on a lower side of an area not corresponding to the second area, the illumination method including refracting light emitted from the light source to change a direction of the light emitted by the light source toward a lower surface of the second area, refracting and collimating the light incident on the lower surface of the second area to change the direction of the light incident on the lower surface of the second area toward a lower surface of the window panel, and diffusing the light incident on the lower surface of the window panel to emit flood illumination light.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
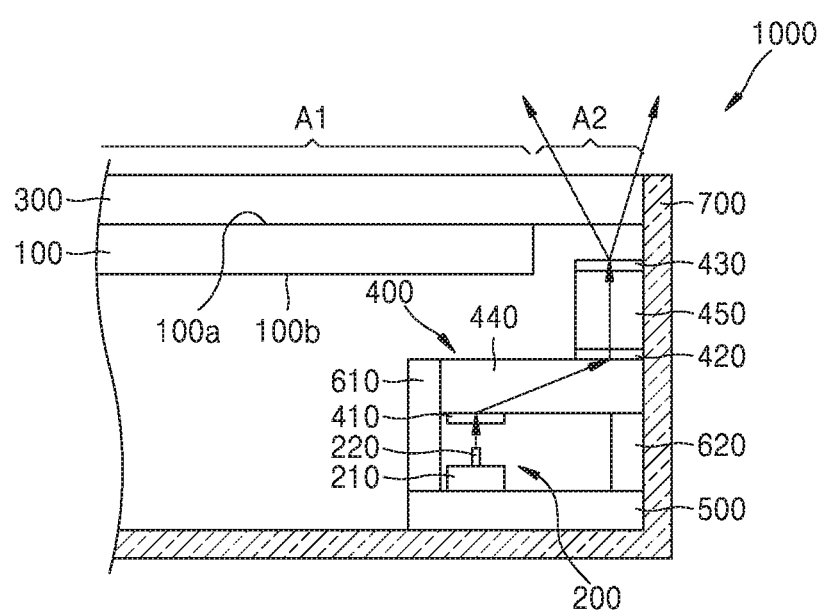
FIG. 1 is a side cross-sectional view illustrating an illumination device according to an example embodiment.

Reference will now be made in detail to example embodiments of which are illustrated in the accompanying drawings, wherein like reference numerals refer to like elements throughout, and the size or thickness of each element may be exaggerated for clarity of illustration. In this regard, the example embodiments may have different forms and should not be construed as being limited to the descriptions set forth herein. Accordingly, the example embodiments are merely described below, by referring to the figures, to explain aspects. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that although the terms "first," "second," etc. may be used herein to describe various elements, these elements should not be limited by these terms. These terms are only used to distinguish one element from other elements.

In the following description, when an element is referred to as being "above" or "on" another element, it may be directly on the other element while making contact with the other element or may be above the other element without making contact with the other element.

In the present disclosure, it will be further understood that the terms "comprises" and/or "comprising" specify the presence of stated features or elements, but do not preclude the presence or addition of one or more other features or elements.

Figure 2:
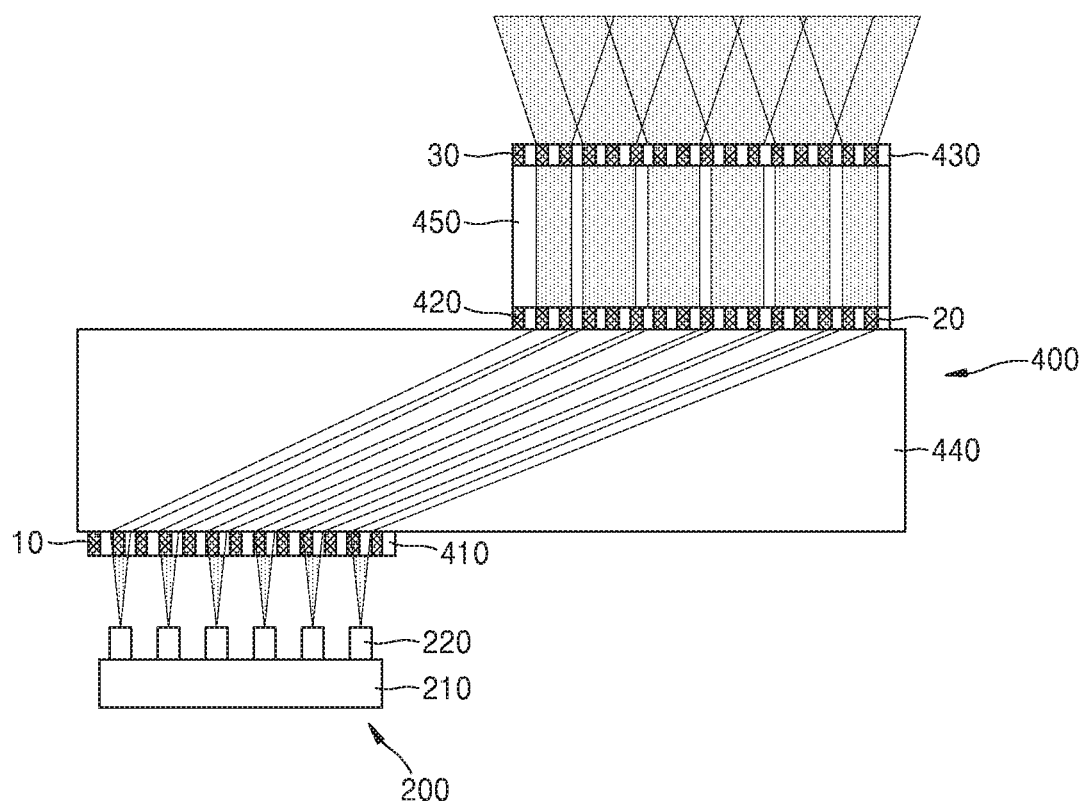
FIG. 2 is a side cross-sectional view illustrating a state in which the propagation direction of light is changed by a light transmitting unit shown in FIG. 1.

FIG. 1 is a side cross-sectional view illustrating an illumination device 1000 according to an example embodiment. FIG. 2 is a side cross-sectional view illustrating a state in which the propagation direction of light is changed by a light transmitting unit 400 shown in FIG. 1.

Referring to FIG. 1, the illumination device 1000 may include a display panel 100 having a first surface 100a and a second surface 100b that face each other, the display panel 100 being configured to output light having image information through the first surface 100a, a light source 200 spaced apart from the display panel 100 in a direction away from the second surface 100b of the display panel 100, a window panel 300 including a first area A1 transmitting light output from the display panel 100 and a second area A2 transmitting light emitted from the light source 200, and the light transmitting unit 400 arranged between the window panel 300 and the light source 200 and transmitting light emitted from the light source 200 to an object through the second area A2, the light transmitting unit 400 including at least one meta-surface. In addition, the illumination device 1000 may further include a support substrate 500 provided on a lower side of the light source 200, a plurality of support portions, for example, a first support portion 610 and a second support portion 620 provided between the support substrate 500 and the light transmitting unit 400 to ensure a space in which the light source 200 is provided, and a housing 700 surrounding the window panel 300, the light transmitting unit 400, the support substrate 500, and the second support portion 620.

The display panel 100 may include the first surface 100*a* through which light having image information is output, and the second surface 100*b* opposite to the first surface 100*a*, wherein a plurality of display pixels may be arranged between the first surface 100*a* and the second surface 100*b*.

The display panel 100 may include a display element such as a liquid crystal display (LCD) or an organic light-emitting diode (OLED). When the display element is an LCD, the display panel 100 may be provided with a separate light source for the display element. The display element is divided into a plurality of regions on which on-off control is performed according to image information, and the regions may be display pixels.

The light source 200 may be a light-emitting array including a plurality of light-emitting elements 220 and a substrate 210. For example, the light-emitting elements 220 may be LEDs or laser diodes configured to emit laser light. The light-emitting elements 220 may be vertical cavity surface emitting lasers (VCSELs). The light-emitting elements 220 may be distributed feedback (DFB) lasers. For example, each of the light-emitting elements 220 may include an active layer that has a III-V group semiconductor material or a II-VI group semiconductor material and a multi-quantum well structure. However, the light-emitting elements 220 are not limited thereto. The light-emitting elements 220 may emit laser light having a wavelength of about 850 nm or about 940 nm, or may emit light in a near infrared wavelength band or a visible light wavelength band. The wavelength of light emitted from the light-emitting elements 220 is not particularly limited, and the light-emitting elements 220 may be configured to emit light in a desired wavelength band.

The window panel 300 may include a material that transmits light. For example, the window panel 300 may include, but is not limited to, glass. The display panel 100 may be provided on the window panel 300 in the first area A1 of the window panel 300. Thus, light output from the display panel 100 may pass through the first area A1. The first area A1 may be a center portion of the window panel 300. The display panel 100 is not provided in the second area A2. For example, the light transmitting unit 400 may be provided in the second area A2. As a result, light emitted from the light source 200 and passing through the light transmitting unit 400 may propagate through the second area A2. The second area A2 may be an edge portion of the window panel 300.

The light transmitting unit 400 may be arranged between the window panel 300 and the light source 200, and may transmit light emitted from the light source 200 to an object through the second area A2. The light transmitting unit 400 may include a first meta-surface 410 that deflects light emitted from the light source 200 such that the light may have a first directivity. The light transmitting unit 400 may include a second meta-surface 420 that deflects the light deflected by the first meta-surface 410 and having the first directivity such that the light may have a second directivity different from the first directivity. The second meta-surface 420 may be provided between the first meta-surface 410 and the window panel 300. The light transmitting unit 400 may include a third meta-surface 430 which diffuses the light deflected by the second meta-surface 420. The third meta-surface 430 may be provided between the second meta-surface 420 and the window panel 300. A center portion of the second meta-surface 420 and a center portion of the third meta-surface 430 may face the second area A2. However, example embodiments are not limited thereto. For example, a central portion of the first meta-surface 410 may face the first area A1. Accordingly, a center portion of the first meta-surface 410 may be closer to the display panel 100 than the center portion of the second meta-surface 420 is to the display panel 100. The first meta-surface 410 faces the light source 200 in a direction normal to the first meta-surface 410, and thus it is difficult to arrange the light source 200 to face the second area A2 in a direction normal to the second area A2 because of design limitations. As described above, the light transmitting unit 400 may change the propagation direction of light emitted from the light source 200 that does not face the second area A2 in a direction normal to the second area A2 such that the light may be incident on the second area A2 in a direction normal to the second area A2. The process in which the propagation direction of light emitted from the light source 200 is changed by the light transmitting unit 400 will be described later with reference to FIG. 2.

In addition, the light transmitting unit 400 may include a first substrate 440 between the first meta-surface 410 and the second meta-surface 420. The light transmitting unit 400 may include a second substrate 450 between the second meta-surface 420 and the third meta-surface 430. The first substrate 440 and the second substrate 450 may be paths through which light emitted from the light source 200 propagates. For example, the first substrate 440 and the second substrate 450 may include, but are not limited thereto, glass configured to transmit light.

The distance between the light transmitting unit 400 and the window panel 300 may be less than the distance between the light transmitting unit 400 and the light source 200. For example, the distance between the window panel 300 and the third meta-surface 430 facing the second area A2 may be less than the distance between the first meta-surface 410 and the light source 200.

Referring to FIG. 2, the light transmitting unit 400 may include the first substrate 440, the first meta-surface 410 and the second meta-surface 420 provided on opposite sides of the first substrate 440, the second substrate 450 provided on the second meta-surface 420, and the third meta-surface 430 provided on the second substrate 450. The first meta-surface 410 and the second meta-surface 420 may not face each other in a direction normal to the first meta-surface 410 and the second meta-surface 420 with the first substrate 440 therebetween. The third meta-surface 430 and the second meta-surface 420 may face each other with the second substrate 450 therebetween. Light coming from the light source 200 may be incident on the first meta-surface 410. The first meta-surface 410 may deflect the light emitted from the light source 200 such that the light may have a first directivity. For example, the first meta-surface 410 may refract light emitted from the light source 200 such that the light may have a first directivity. Light emitted from the plurality of light-emitting elements 220 may not be uniformly refracted by the first meta-surface 410. The first directivity may indicate a direction toward the center portion of the second meta-surface 420 from the center portion of the first meta-surface 410. The direction toward the center portion of the second meta-surface 420 may include a direction exactly toward the center of the second meta-surface 420 and a direction toward the vicinity of a region in which the second meta-surface 420 is located. Therefore, light emitted from the light source 200 may propagate from the first meta-surface 410 toward the second meta-surface 420 by passing through the inside of the first substrate 440. As the light emitted from the light source 200 propagates from the first meta-surface 410 to the second meta-surface 420 as described above, the beam width of the light may increase. For example, the beam width of the light output at the first meta-surface 410 may be less than the beam width of the light incident on the second meta-surface 420.

The light deflected by the first meta-surface 410 may be deflected by the second meta-surface 420 such that the light may have a second directivity. For example, the second meta-surface 420 may refract light output from the first meta-surface 410 such that the light may have a second directivity. The second directivity may indicate a direction toward the center portion of the third meta-surface 430 from the center portion of the second meta-surface 420. The direction toward the center portion of the third meta-surface 430 may include a direction exactly toward the center of the third meta-surface 430 and a direction toward the vicinity of a region in which the third meta-surface 430 is located. Accordingly, the light may propagate toward the third meta-surface 430 in a direction normal to the third meta-surface 430. In addition, the second directivity may be the same as the direction in which light propagates from the light source 200 toward the first meta-surface 410. In addition, the second meta-surface 420 may simultaneously refract and collimate the light output from the first meta-surface 410. Accordingly, the light output from the first meta-surface 410 may be collimated by the second meta-surface 420, and then the light may proceed toward the third meta-surface 430 as parallel light.

The light deflected by the second meta-surface 420 may be diffused by the third meta-surface 430. The light diffused by the third meta-surface 430 may be transmitted to an object located outside the illumination device 1000 as flood illumination light. The field of view of the flood illumination formed by the third meta-surface 430 may be about 80 degrees, but is not limited thereto.

The first meta-surface 410, the second meta-surface 420, and the third meta-surface 430 may respectively include a plurality of first nanostructures 10, a plurality of second nanostructure 20, and a plurality of third nanostructures 30 which have a shape dimension less than the wavelength of light emitted from the light source 200. For example, the thickness or width of the first nanostructure 10, the second nanostructure 20, and third nanostructure 30, which defines the shape of the first nanostructure 10, the second nanostructure 20, and third nanostructure 30, may be less than the wavelength of light emitted from the light source 200. The first nanostructure 10, the second nanostructure 20, and third nanostructure 30 may have various shapes such as a cylinder shape, an elliptic cylinder shape, or a polygonal cylinder shape. The first nanostructure 10, the second nanostructure 20, and third nanostructure 30 may respectively include a material having a refractive index greater than the refractive index of a surrounding material, for example, air, or the refractive index of the first substrate 440 and the second substrate 450. For example, the first nanostructure 10, the second nanostructure 20, and third nanostructure 30 may include one of single crystal silicon (Si), poly Si, amorphous Si, silicon nitride ($Si_3N_4$), gallium phosphide (GaP), titanium oxide ($TiO_2$), aluminum antimonide (AlSb), aluminum arsenide (AlAs), aluminum gallium arsenide (AlGaAs), aluminum gallium indium phosphide (AlGaInP), boron phosphide (BP), and zinc germanium phosphide ($ZnGeP_2$).

The first nanostructure 10, the second nanostructure 20, and third nanostructure 30 may change the propagation direction of incident light depending on factors such as the shape or arrangement of the first nanostructure 10, the second nanostructure 20, and third nanostructure 30. For example, the shape distribution of the first nanostructures 10 may be determined such that the first meta-surface 410 may refract light emitted from the light source 200. In addition, the shape distribution of the second nanostructures 20 may be determined such that the second meta-surface 420 may refract and collimate light output from the first meta-surface 410. In addition, the shape distribution of the third nanostructures 30 may be determined such that the third meta-surface 430 may diffuse light coming from the second meta-surface 420. Here, the shape distribution may include the shape and size of the first nanostructure 10, the second nanostructure 20, and third nanostructure 30. In addition, the shape distribution may include the distribution of the arrangement pitches of the first nanostructure 10, the second nanostructure 20, and third nanostructure 30. Accordingly, one or more of the thickness, the width, and the arrangement interval of the first nanostructure 10, the second nanostructure 20, and third nanostructure 30 may be equal to or less than half the wavelength of light emitted from the light source 200. In FIG. 2, the first nanostructure 10, the second nanostructure 20, and third nanostructure 30 are illustrated as having a constant size and a constant arrangement interval. However, example embodiments are not limited thereto.

The first substrate 440 and the second substrate 450 may support the first nanostructure 10, the second nanostructure 20, and third nanostructure 30, and may include a material having a refractive index less than the refractive index of the first nanostructure 10, the second nanostructure 20, and third nanostructure 30. The difference between the refractive index of the first substrate 440 and the second substrate 450 and the refractive index of the first nanostructure 10, the second nanostructure 20, and third nanostructure 30 may be about 0.5 or greater. For example, the first substrate 440 and the second substrate 450 may include $SiO_2$, a transparent conductive oxide (TCO), or a polymer such as polycarbonate (PC), polystyrene (PS), or polymethylmethacrylate (PMMA), but are not limited thereto.

Figure 3:
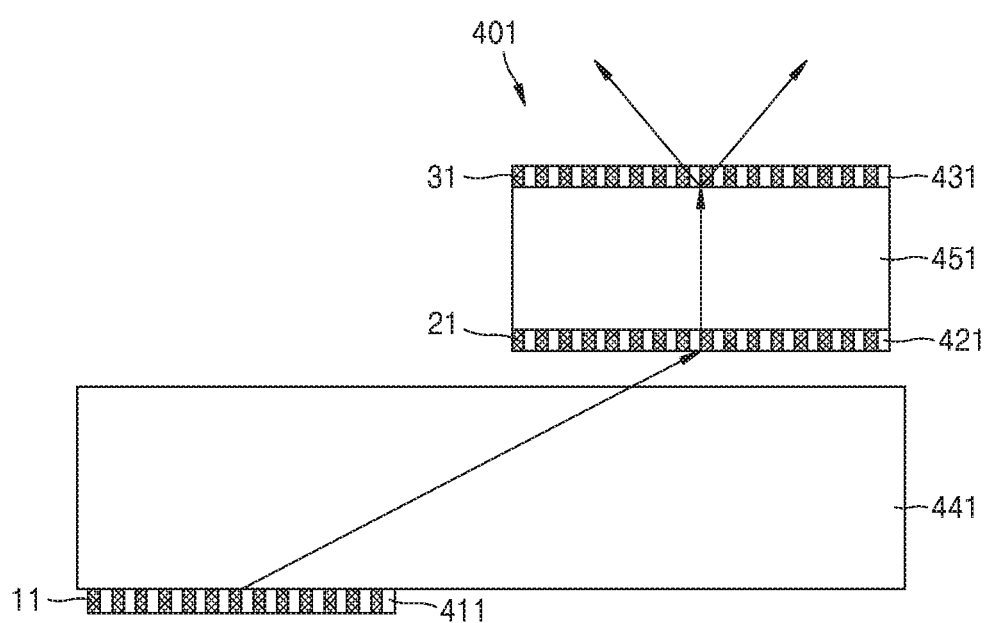
FIG. 3 is an example side cross-sectional view illustrating a light transmitting unit according to an example embodiment.
Figure 4:
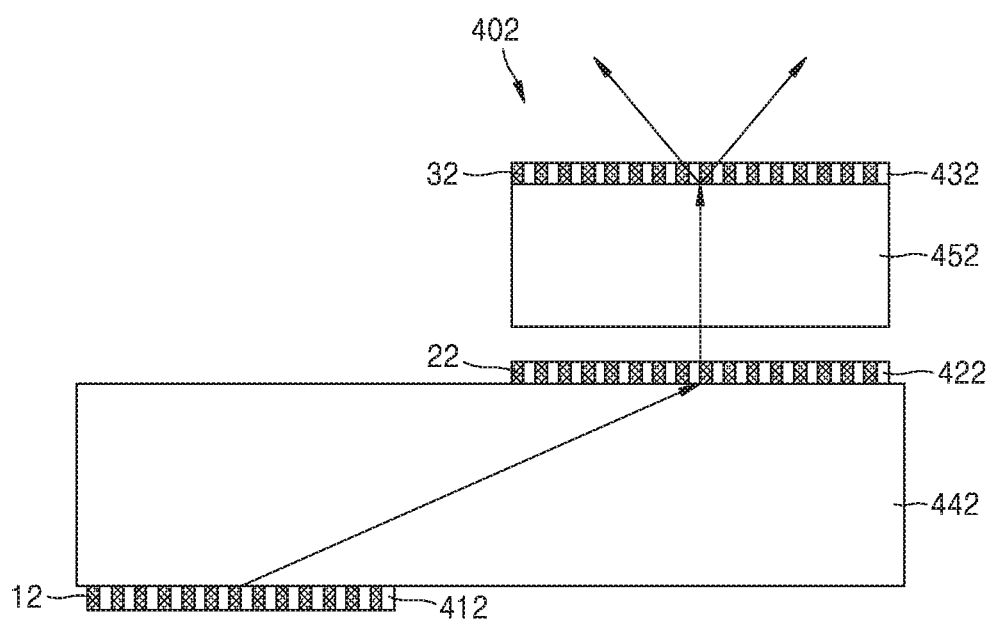
FIG. 4 is an example side cross-sectional view illustrating a light transmitting unit according to an example embodiment.

FIG. 3 is an example side cross-sectional view illustrating a light transmitting unit 401 according to an example embodiment. FIG. 4 is an example side cross-sectional view illustrating a light transmitting unit 402 according to an example embodiment. In FIGS. 3 and 4, the propagation directions of light are simply indicated with arrows. The arrows indicate only the directivity of light and do not specifically show how light actually propagates. The light transmitting unit 401 shown in FIG. 3 or the light transmitting unit 402 shown in FIG. 4 may replace the light transmitting unit 400 shown in FIG. 1.

Referring to FIG. 3, the light transmitting unit 401 may include a first substrate 441, first meta-surface 411 and second meta-surface 421 provided on opposite sides of the first substrate 441, a second substrate 451 provided on a second meta-surface 421, and a third meta-surface 431 provided on the second substrate 451. The first meta-surface 411 and the second meta-surface 421 may not face each other in a direction normal to the first meta-surface 411 with the second meta-surface 421 with respect to the first substrate 441 therebetween. The third meta-surface 431 and the second meta-surface 421 may face each other in a direction normal to the third meta-surface 431 and the second meta-surface 421 with the second substrate 451 therebetween. The second meta-surface 421 may be provided on the second substrate 451 and spaced apart from the first substrate 441. Accordingly, a gap may be formed between the second meta-surface 421 and the first substrate 441. Light having a first directivity output from the first meta-surface 411 may propagate in the first substrate 441. The first directivity may indicate a direction toward a center portion of the second meta-surface 421 from a center portion of the first meta-surface 411. The direction toward the center portion of the second meta-surface 421 may include a direction exactly toward the center of the second meta-surface 421 and a direction toward the vicinity of a region in which the second meta-surface 421 is located. The light having the first directivity may pass through the first substrate 441 and the gap, and may then be incident on the second meta-surface 421. The light incident on the second meta-surface 421 may be modified to have a second directivity by the second meta-surface 421. The second directivity may indicate a direction toward a center portion of the third meta-surface 431 from the center portion of the second meta-surface 421. The direction toward the center portion of the third meta-surface 431 may include a direction exactly toward the center of the third meta-surface 431 and a direction toward the vicinity of a region in which the third meta-surface 431 is located. The light having the second directivity may propagate in the second substrate 451. The light propagating in the second substrate 451 may be incident on the third meta-surface 431 in a direction normal to the third meta-surface 431 which is provided on the second substrate 451. The light incident on the third meta-surface 431 may be diffused by the third meta-surface 431.

As described above, the first meta-surface 411, the second meta-surface 412, and the third meta-surface 431 may respectively have a plurality of first nanostructures 11, a plurality of second nanostructures 21, and a plurality of third nanostructures 31. The first nanostructure 11, the second nanostructure 21, and the third nanostructure 31 may change the propagation direction of incident light depending on factors such as the shape or arrangement of the first nanostructure 11, the second nanostructure 21, and the third nanostructure 31. For example, the shape distribution of first nanostructures 11 may be determined such that the first meta-surface 411 may refract light emitted from a light source 201. In addition, the shape distribution of the second nanostructures 21 may be determined such that the second meta-surface 421 may refract and collimate light output from the first meta-surface 411. In addition, the shape distribution of the third nanostructures 31 may be determined such that the third meta-surface 431 may diffuse light coming from the second meta-surface 421.

Referring to FIG. 4, the light transmitting unit 402 may include a first substrate 442, first meta-surface 412 and second meta-surface 422 provided on opposite sides of the first substrate 442, a second substrate 452 provided on the second meta-surface 422, and a third meta-surface 432 provided on the second substrate 452. The first meta-surface 412 and the second meta-surface 422 may not face each other in a direction normal to the first meta-surface 412 and the second meta-surface 422 with the first substrate 442 therebetween. The third meta-surface 432 and the second meta-surface 422 may face each other in a direction normal to the second meta-surface 422 and the third meta-surface 432 with the second substrate 452 therebetween. The second meta-surface 422 may be provided on the first substrate 442 and spaced apart from the second substrate 452. Accordingly, a gap may be formed between the second meta-surface 422 and the second substrate 452. Light refracted by the first meta-surface 412 and thus having a first directivity may propagate in the first substrate 442. The first directivity may indicate a direction toward a center portion of the second meta-surface 422 from a center portion of the first meta-surface 412. The direction toward the center portion of the second meta-surface 422 may include a direction exactly toward the center of the second meta-surface 422 and a direction toward the vicinity of a region in which the second meta-surface 422 is located. In addition, the light propagating in the first substrate 442 is refracted and collimated by the second meta-surface 422 and thus has a second directivity, and then the light may be incident on the second substrate 452 after passing through the gap between the second meta-surface 422 and the second substrate 452. The second directivity may indicate a direction toward a center portion of the third meta-surface 432 from the center portion of the second meta-surface 422. The direction toward the center portion of the third meta-surface 432 may include a direction exactly toward the center of the third meta-surface 432 and a direction toward the vicinity of a region in which the third meta-surface 432 is located. The Light incident on the second substrate 452 may propagate in the second substrate 452 and may then be incident on the third meta-surface 432 in a direction normal to the third meta-surface 432 which is provided on the second substrate 452. The light incident on the third meta-surface 432 may be diffused by the third meta-surface 432.

As described above, the first meta-surface 412, the second meta-surface 422, and the third meta-surface 432 may respectively have a plurality of first nanostructures 12, a plurality of second nanostructures 22, and a plurality of third nanostructures 32. As described above, the first meta-surface 412, the second meta-surface 422, and the third meta-surface 432 may respectively include a plurality of first nanostructures 12, a plurality of second nanostructures 22, and a plurality of third nanostructures 32. The first nanostructure 12, the second nanostructure 22, and the third nanostructure 32 may change the propagation direction of incident light depending on factors such as the shape or arrangement of the first nanostructure 12, the second nanostructure 22, and the third nanostructure 32. For example, the shape distribution of the first nanostructures 12 may be determined such that the first meta-surface 412 may refract light emitted from a light source 202. In addition, the shape distribution of the second nanostructures 22 may be determined such that the second meta-surface 422 may refract and collimate light output from the first meta-surface 412. In addition, the shape distribution of the third nanostructures 32 may be determined such that the third meta-surface 432 may diffuse light coming from the second meta-surface 422.

Figure 5:
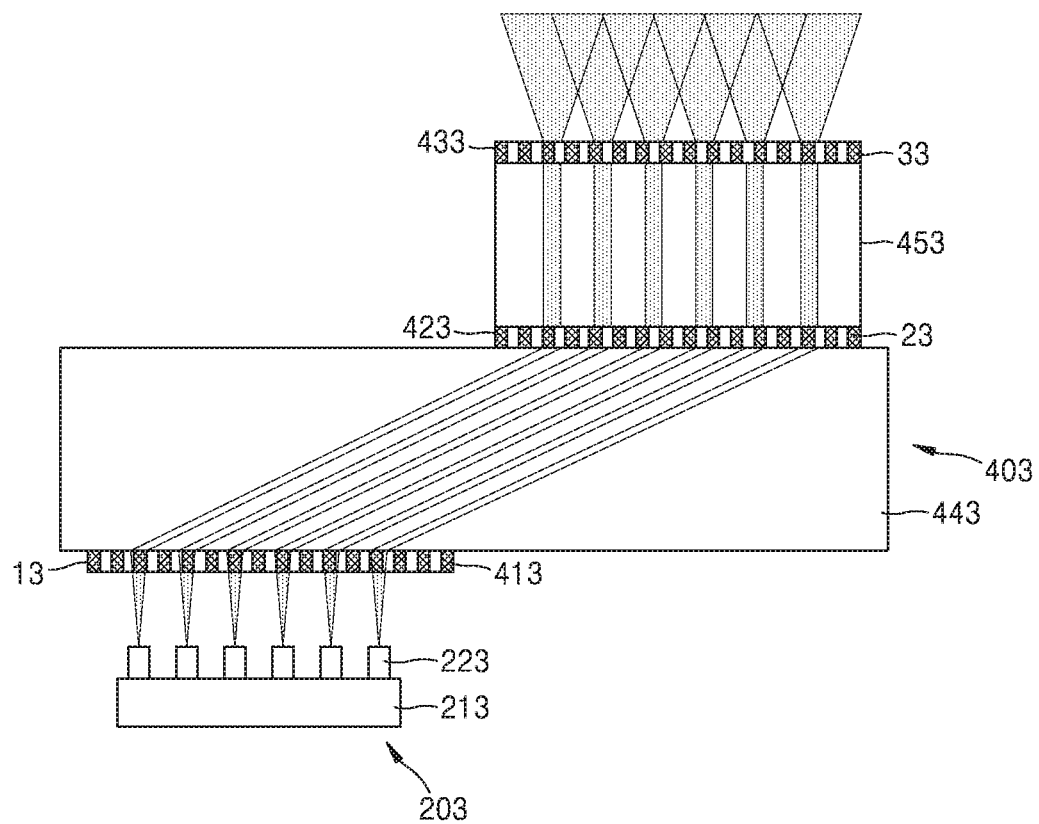
FIG. 5 is a side cross-sectional view illustrating a state in which the propagation direction of light is changed by a light transmitting unit according to an example embodiment.

FIG. 5 is a side cross-sectional view illustrating a state in which the propagation direction of light is changed by a light transmitting unit 403 according to an example embodiment.

Referring to FIG. 5, the light transmitting unit 403 may include a first substrate 443, first meta-surface 413 and second meta-surface 423 provided on opposite sides of the first substrate 443, a second substrate 453 provided on the second meta-surface 423, and a third meta-surface 433 provided on the second substrate 453. The first meta-surface 413 and the second meta-surface 423 may not face each other in a direction normal to the first meta-surface 413 and the second meta-surface 423 with the first substrate 443 therebetween. The third meta-surface 433 and the second meta-surface 423 may face each other in a direction normal to the second meta-surface 423 and the third meta-surface 433 with the second substrate 453 therebetween. Light emitted from a light source 203 may be incident on the first meta-surface 413. The first meta-surface 413 may deflect the light emitted from the light source 203 such that the light may have a first directivity. For example, the first meta-surface 413 may refract light emitted from the light source 203 such that the light may have a first directivity. Light emitted from a plurality of light-emitting elements 223 may not be uniformly refracted by the first meta-surface 413. The first directivity may indicate a direction toward a center portion of the second meta-surface 423 from a center portion of the first meta-surface 413. The direction toward the center portion of the second meta-surface 423 may include a direction exactly toward the center of the second meta-surface 423 and a direction toward the vicinity of a region in which the second meta-surface 423 is located. In addition, the first meta-surface 413 may collimate the light output from the light source 203. Therefore, the light emitted from the light source 203 may propagate, as parallel light, from the first meta-surface 413 toward the second meta-surface 423 through the inside of the first substrate 443. While the light from the light source 203 propagates from the first meta-surface 413 to the second meta-surface 423 as described above, the beam width of the light may be constant. For example, the beam width of the light output at the first meta-surface 413 may be equal to the beam width of the light incident on the second meta-surface 423.

The light deflected by the first meta-surface 413 may be deflected by the second meta-surface 423 such that the light may have a second directivity. For example, the second meta-surface 423 may refract the light output from the first meta-surface 413 such that the light may have a second directivity. The degree of refraction of the light may not be constant at a plurality of points of the first meta-surface 413. The second directivity may indicate a direction toward a center portion of the third meta-surface 433 from the center portion of the second meta-surface 423. The direction toward the center portion of the third meta-surface 433 may include a direction exactly toward the center of the third meta-surface 433 and a direction toward the vicinity of a region in which the third meta-surface 433 is located. Accordingly, the light may propagate toward the third meta-surface 433 in a direction normal to the third meta-surface 433. In addition, the second directivity may be the same as the direction in which light propagates from the light source 203 toward the first meta-surface 413. In addition, the second meta-surface 423 may simultaneously refract and collimate the light output from the first meta-surface 413. Accordingly, the light output from the first meta-surface 413 may be collimated by the second meta-surface 423, and then the light may proceed toward the third meta-surface 433 as parallel light.

The light deflected by the second meta-surface 423 may be diffused by the third meta-surface 433. The light diffused by the third meta-surface 433 may be transmitted to an object as flood illumination light.

As described above, the first meta-surface 413, the second meta-surface 423, and the third meta-surface 433 may respectively include a plurality of first nanostructures 13, a plurality of second nanostructures 23, and a plurality of third nanostructures 33. The first nanostructures 13, the second nanostructures 23, and the third nanostructures 33 may vary the propagation direction of incident light depending on factors such as the shape or arrangement of the first nanostructures 13, the second nanostructures 23, and the third nanostructures 33. For example, the shape distribution of the first nanostructures 13 may be determined such that the first meta-surface 413 may refract and collimate light emitted from the light source 203. In addition, the shape distribution of the second nanostructures 23 may be determined such that the second meta-surface 423 may refract and collimate light output from the first meta-surface 413. In addition, the shape distribution of the third nanostructures 33 may be determined such that the third meta-surface 433 may diffuse light output from the second meta-surface 423.

In addition, although the second meta-surface 423 is illustrated as being in contact with both the first substrate 443 and the second substrate 453, the second meta-surface 423 is not limited thereto. For example, similar to the second meta-surface 421 shown in FIG. 3, the second meta-surface 423 may be provided on the second substrate 453 and spaced apart from the first substrate 443. In this example, a gap may be formed between the second meta-surface 423 and the first substrate 443. In addition, similar to the second meta-surface 422 shown in FIG. 4, the second meta-surface 423 may be provided on the first substrate 443 and spaced apart from the second substrate 453. In this example, a gap may be formed between the second meta-surface 423 and the second substrate 453.

Figure 6:
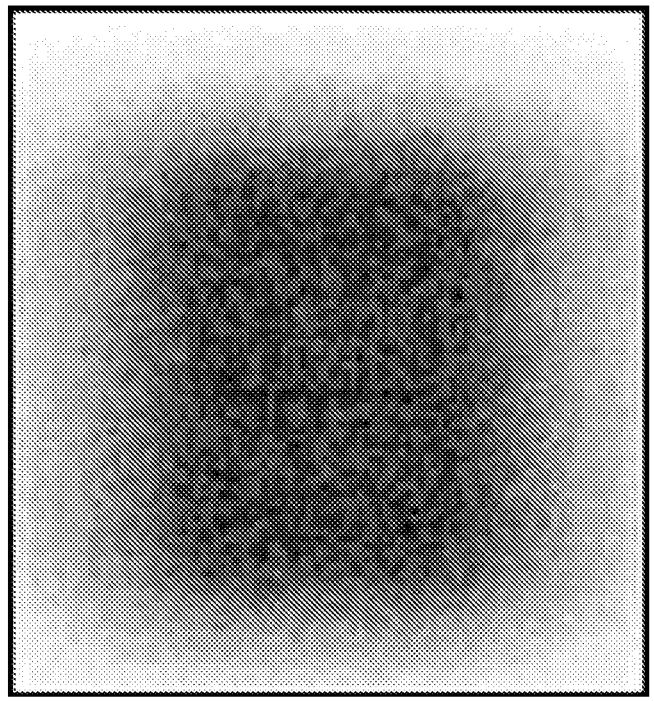
FIG. 6 is a view illustrating a simulation of flood illumination by the illumination device shown in FIG. 1.

FIG. 6 is a view illustrating a simulation of flood illumination by the illumination device 1000 shown in FIG. 1.

Referring to FIG. 6, light from the light source 200 may be diffused by the light transmitting unit 400 and may then be transmitted through the second area A2 to illuminate an object as flood illumination light. That is, the light transmitting unit 400 may convert light emitted from the light source 200 into flood illumination light to entirely illuminate the object at once with a uniform light distribution.

Figure 7:
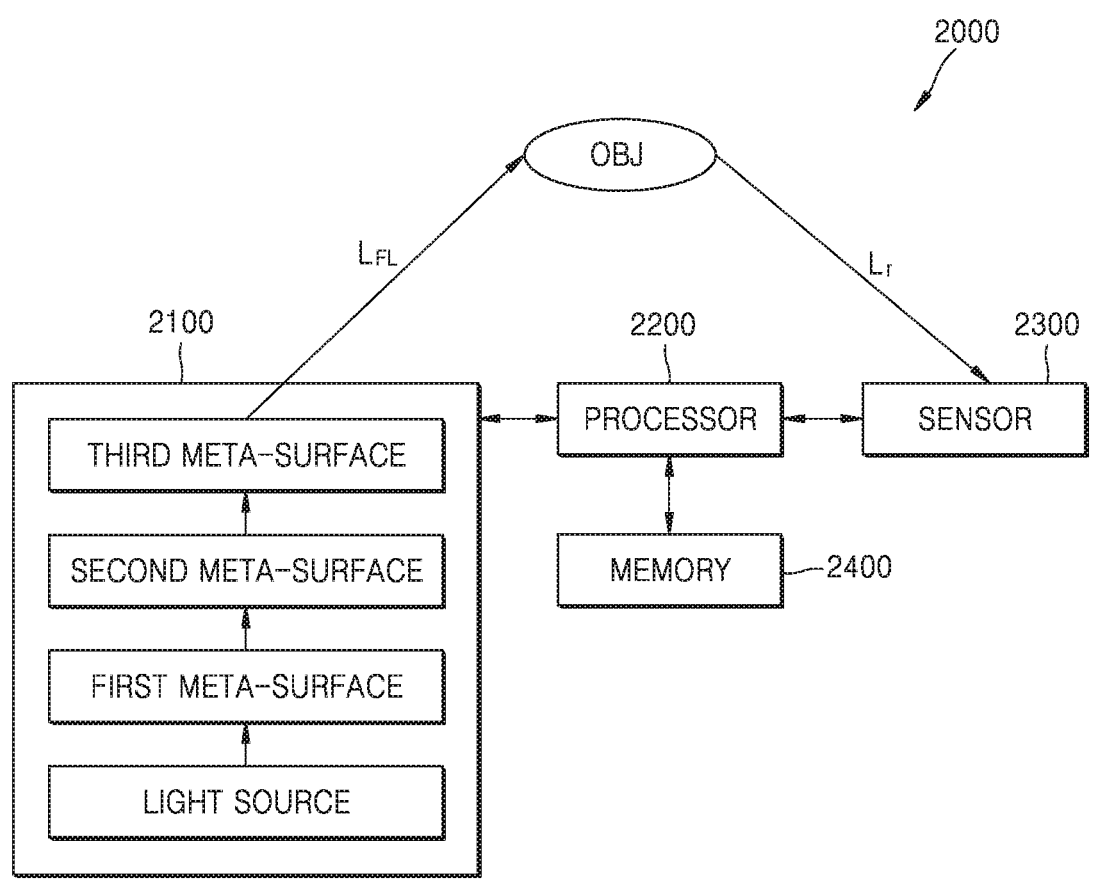
FIG. 7 is a block diagram illustrating a configuration of an electronic apparatus according to an example embodiment.

FIG. 7 is a block diagram illustrating a configuration of an electronic apparatus 2000 according to an example embodiment.

Referring to FIG. 7, the electronic apparatus 2000 may include an illumination device 2100 configured to illuminate an object OBJ with flood light, a sensor 2300 configured to receive light reflected from the object OBJ, and a processor 2200 configured to perform an operation to acquire information about the object OBJ from the light that the sensor 2300 has received. The electronic apparatus 2000 may further include a memory 2400 to store codes and other data for operating the processor 2200.

The illumination device 2100 may include a light source, a first meta-surface, a second meta-surface, and a third meta-surface, and may illuminate the object OBJ by changing the distribution of light emitted from the light source and transmitting the light toward the object OBJ through a bezel of a display panel. The illumination device 2100 may be one of the illumination devices of the example embodiments described with reference to FIGS. 1 to 5, a combination thereof, or a modification thereof.

Additional optical devices may be arranged between the illumination device 2100 and the object OBJ to adjust the direction of light $L_{FL}$ emitted from the illumination device 2100 toward the object OBJ or additionally modulate the light $L_{FL}$.

The illumination device 2100 may illuminate the object OBJ with flood light $L_{FL}$. The flood light $L_{FL}$ may be light capable of illuminating the object OBJ entirely at once with a uniform light distribution. Uniform light distribution may not be a state of 100% uniformity but a state in which an illumination target region of the object OBJ is substantially uniformly illuminated. Specific structures of the first meta-surface, the second meta-surface, and the third meta-surface, that is, the shape distribution of nanostructures provided on the first meta-surface, the second meta-surface, and the third meta-surface may be determined to obtain a desired uniformity distribution of flood light $L_{FL}$ according to the position and shape of the object OBJ. The object OBJ may be the face of a user of the electronic apparatus 2000. The position of the object OBJ may be about 30 cm to about 1 m away from the illuminating device 2100, but is not limited thereto.

The sensor 2300 senses light $L_r$ reflected from the object OBJ. The sensor 2300 may include an array of light detecting elements. The sensor 2300 may further include a spectroscopic element to analyze light $L_r$ reflected from the object OBJ according to wavelengths of the light $L_r$.

The processor 2200 may perform an operation using light detected by the sensor 2300 to obtain information about the object OBJ. In addition, the processor 2200 may be responsible for all processing and controlling operations of the electronic apparatus 2000. The processor 2200 may acquire information about the object, for example, may acquire and process two-dimensional or three-dimensional image information about the object OBJ. In addition, the processor 2200 may control overall operations such as the operation of the light source of the illumination device 2100 or the operation of the sensor 2300. In addition, the processor 2200 may also determine whether to authenticate a user based on information acquired from the object OBJ, or may execute other applications.

The memory 2400 may store codes to be executed on the processor 2200. In addition to this, the memory 2400 may store various execution modules to be executed on the electronic apparatus 2000, and data for the execution of the various execution modules. For example, the memory 2400 may store a program code to be used when the processor 2200 performs an operation for acquiring information about the object OBJ, and codes such as application modules to be executed using the information about the object OBJ. In addition, the electronic apparatus 2000 may include additional devices, and the memory 2400 may further store programs such as a communication module, a camera module, a video replay module, or an audio replay module for operating the additional devices.

Results of calculation of the processor 2200, that is, information about the shape and position of the object OBJ may be transmitted to another device or unit if necessary. For example, information about the object OBJ may be transmitted to a controller of another electronic apparatus that uses the information about the object OBJ. The other device or unit to which results of calculation of the processor 2200 are transmitted may be a display device or a printer capable of outputting the results. The other device or unit may be, but is not limited thereto, a smartphone, a cellular phone, a personal digital assistant (PDA), a laptop, a personal computer (PC), a wearable device, a mobile device, or a non-mobile computing device.

The memory 2400 may include at least one type of recording medium selected from the group consisting of a flash memory, a hard disk, a micro multimedia card, a memory card (e.g., a secure digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

For example, the electronic apparatus 2000 may be, but is not limited thereto, a portable mobile communication device, a smartphone, a smart watch, a PDA, a laptop, a PC, a mobile computing device, or a non-mobile computing device. The electronic apparatus 2000 may be an autonomous device such as an unmanned vehicle, an autonomous vehicle, a robot, or a drone, or may be an Internet of things (IoT) device.

Figure 8:
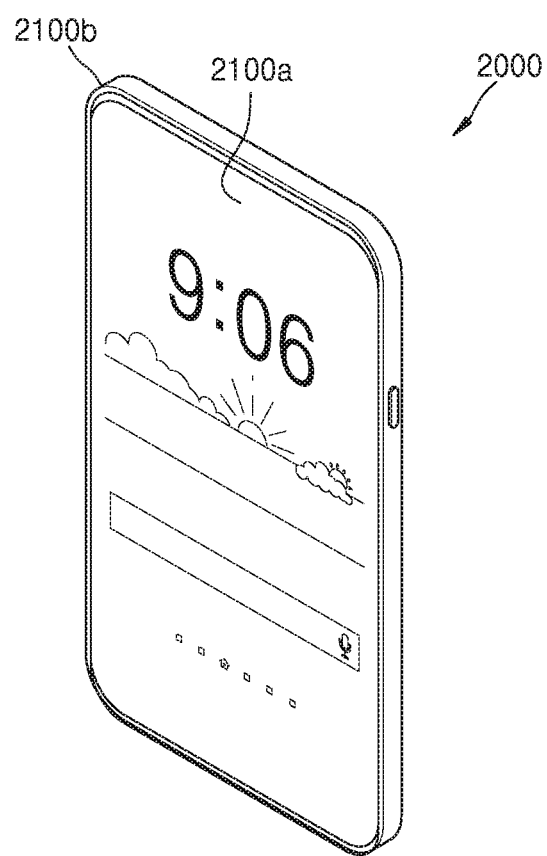
FIG. 8 is a perspective view illustrating an example appearance of the electronic apparatus shown in FIG. 7.

FIG. 8 is a perspective view illustrating an example appearance of the electronic apparatus 2000 shown in FIG. 7.

Referring to FIG. 8, the electronic apparatus 2000 may include a full screen display. That is, a display surface 2100*a* may occupy substantially the entire region of the front surface of the electronic apparatus 2000, and a bezel 2100*b* which is an edge portion of the electronic apparatus 2000 may be very narrow. In addition, the display surface 2100*a* may have a rectangular shape without a notch.

Any one of the illumination devices described with reference to FIGS. 1 to 6 may be provided in the electronic apparatus 2000 such that flood light may be output through the bezel 2100*b* of the electronic apparatus 2000. The flood light output through the bezel 2100*b* may be used to illuminate an object located outside the electronic apparatus 2000. In this manner, light having image information may be output through the display surface 2100*a*, and light for illuminating an object may be output through the bezel 2100*b*. As described above, the bezel 2100*b* on which images are not displayed is used as a region for discharging object illumination light, and thus the spatial efficiency of the electronic apparatus 2000 may be increased. That is, since a space for emitting object illumination light is not additionally required, the size of the electronic apparatus 2000 may be reduced.

Figure 9:
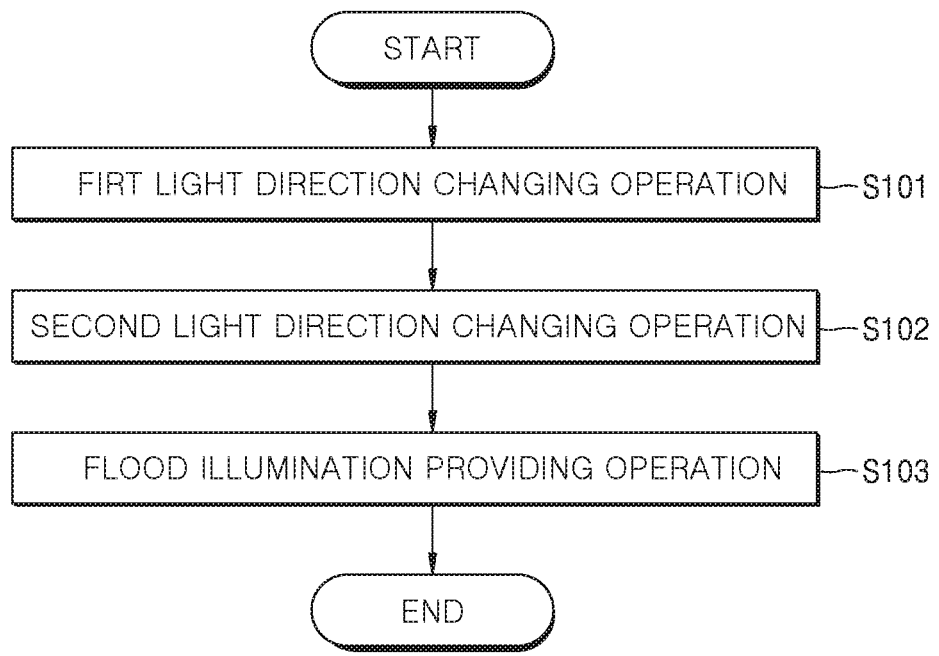
FIG. 9 is a flowchart illustrating an illumination method according to an example embodiment.

FIG. 9 is a flowchart illustrating an illumination method according to an example embodiment.

Referring to FIG. 9, the illumination method may be performed using an illumination device which includes a window panel having a first area and a second area, and a light source provided on a lower side of the window panel. The illumination method may include a first light direction changing operation in which light emitted from the light source is refracted toward the second area of the window panel (S101), a second light direction changing operation in which the light reaching a lower side of the second area of the window panel is refracted and collimated such that the light may propagate perpendicularly toward a lower surface of the window panel (S102), and a flood illumination providing operation in which the light reaching the lower surface of the window panel is diffused (S103).

In the first light direction changing operation S101, light emitted from the light source, which is located at a position does not face the second area of the window panel in a direction normal to the window panel, may be transmitted to a lower side of the second area of the window panel. Based on operation S101, light emitted from the light source, which is not located to face the second area of the window panel in a direction normal to the window panel because of design limitations, may reach the second area of the window panel. In the first light direction changing operation S101, light emitted from the light source may be refracted to change the propagation direction of the light. Furthermore, in the first light direction changing operation S101, the light emitted from the light source may be collimated to provide parallel light.

In the second light direction changing operation S102, the light propagating at an arbitrary angle toward the lower side of the second area of the window panel may be directed such that the light may propagate perpendicularly toward the window panel. Thus, light emitted from the light source may be incident on a lower surface of the second area of the window panel at a direction normal to the lower surface of the second area of the window panel. In the second light direction changing operation S102, the light from the light source may be refracted to change the propagation direction of the light. Furthermore, in the second light direction changing operation S102, the light from the light source may be collimated to provide parallel light.

In the flood illumination providing operation S103, the light reaching the lower surface of the second area of the window panel may be diffused. As the light is diffused as described above, uniform flood light may be provided.

Light emitted from the light source that does not face the second area of the window panel in a direction normal to the second area of the window panel may be directed to the second area of the window panel by the above-described illumination method. Furthermore, flood light may be output through the second area of the window panel. Due to design limitations, the light source may not be arranged to face the second area of the window panel in a direction normal to the second area of the window panel which corresponds to a bezel. In this example, light emitted from the light source may be output through the bezel as flood light by using the above-described illumination method according to an example embodiment.

Light emitted from a light source located on a rear side of a display panel may be output through an edge portion of a display surface of an electronic apparatus by using the above-described illumination device and the illumination method.

Therefore, a light source may be more effectively arranged for various sensors without affecting the size of a display surface of a display panel.

The operations described in the example embodiments which are not intended to limit the scope of the present disclosure. For simplicity of description, electronic configurations, control systems, and software of the related art, and other functional aspects of the systems may not be described. Furthermore, line connections or connection members between elements depicted in the drawings represent functional connections and/or physical or circuit connections by way of example, and in actual applications, they may be replaced or embodied as various additional functional connections, physical connections, or circuit connections.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. An illumination device comprising:
a display panel configured to output light comprising image information;
a light source configured to emit light, the light source being spaced apart from the display panel;
a window panel comprising a first area configured to transmit the light output from the display panel and a second area configured to transmit the light emitted from the light source; and
a light transmitting unit configured to transmit the light emitted from the light source to an object through the second area, the light transmitting unit comprising at least one meta-surface.

2. The illumination device of claim 1, wherein the light transmitting unit is provided between the window panel and the light source.

3. The illumination device of claim 1, wherein the at least one meta-surface of the light transmitting unit comprises:
a first meta-surface configured to deflect the light emitted from the light source such that the light deflected by the first meta-surface has a first directivity;
a second meta-surface configured to deflect the light deflected by the first meta-surface and having the first directivity such that the light deflected by the second meta-surface has a second directivity that is different from the first directivity; and
a third meta-surface configured to diffuse the light deflected by the second meta-surface.

4. The illumination device of claim 3, wherein a center portion of the second meta-surface and a center portion of the third meta-surface face the second area in a direction normal to the second area.

5. The illumination device of claim 4, wherein a center portion of the first meta-surface is closer to the display panel than the center portion of the second meta-surface is to the display panel.

6. The illumination device of claim 5, wherein the first directivity corresponds to a direction from the center portion of the first meta-surface toward the center portion of the second meta-surface.

7. The illumination device of claim 5, wherein the second directivity corresponds to a direction from the center portion of the second meta-surface toward the center portion of the third meta-surface.

8. The illumination device of claim 5, wherein the second directivity is equal to a direction in which the light emitted from the light source propagates toward the first meta-surface.

9. The illumination device of claim 3, wherein the light transmitting unit further comprises a first substrate provided between the first meta-surface and the second meta-surface, and a second substrate provided between the second meta-surface and the third meta-surface.

10. The illumination device of claim 3, wherein the first meta-surface comprises:
a plurality of first nanostructures having a shape dimension which is less than a wavelength of the light emitted from the light source.

11. The illumination device of claim 10, wherein the first meta-surface is configured to collimate the light emitted from the light source based on a shape and a distribution of each of the plurality of first nanostructures.

12. The illumination device of claim 3, wherein the second meta-surface comprises a plurality of second nanostructures having a shape dimension which is less than a wavelength of the light from the light source.

13. The illumination device of claim 12, wherein the second meta-surface is configured to collimate the light output from the first meta-surface based on a shape and a distribution of each of the plurality of second nanostructures.

14. The illumination device of claim 3, wherein the third meta-surface comprises a plurality of third nanostructures having a shape dimension which is less than a wavelength of the light from the light source.

15. The illumination device of claim 14, wherein the third meta-surface is configured to diffuse and transmit the light output from the second meta-surface to radiate the object with flood illumination based on a shape and a distribution of each of the plurality of third nanostructures.

16. The illumination device of claim 15, wherein the flood illumination has a field of view of 80 degrees.

17. The illumination device of claim 1, wherein the light source comprises a plurality of light-emitting elements.

18. The illumination device of claim 17, wherein each of the plurality of light-emitting elements comprises a vertical cavity surface emitting laser.

19. The illumination device of claim 1, further comprising:
- a support substrate provided on a lower side of the light source opposite to the light transmitting unit;
- a plurality of support portions provided between the support substrate and the light transmitting unit and configured to provide a space in which the light source is provided; and
- a housing surrounding the window panel, the light transmitting unit, the support substrate, and the plurality of support portions.

20. An electronic apparatus comprising:
an illumination device comprising:
- a display panel configured to output light comprising image information;
- a light source configured to emit light, the light source being spaced apart from the display panel;
- a window panel comprising a first area configured to transmit the light output from the display panel and a second area configured to transmit the light emitted from the light source; and
- a light transmitting unit configured to transmit the light emitted from the light source to an object through the second area, the light transmitting unit comprising at least one meta-surface; and
a sensor configured to receive light reflected from the object; and
a processor configured to acquire information about the object based on the light received by the sensor.

* * * * *